Dec. 28, 1965      L. K. DAVIS      3,226,062
OSCILLATION DAMPING SYSTEM
Filed June 18, 1964      2 Sheets-Sheet 1

INVENTOR.
LOUIS K. DAVIS
BY
Henry W. Kaufmann
AGENT

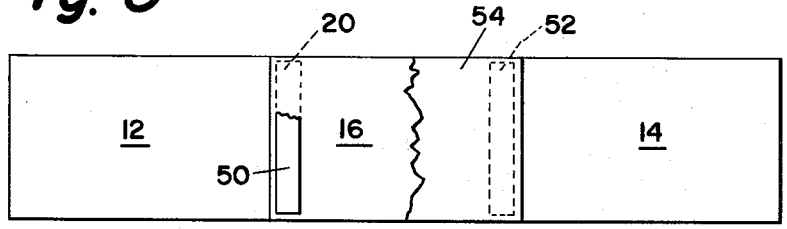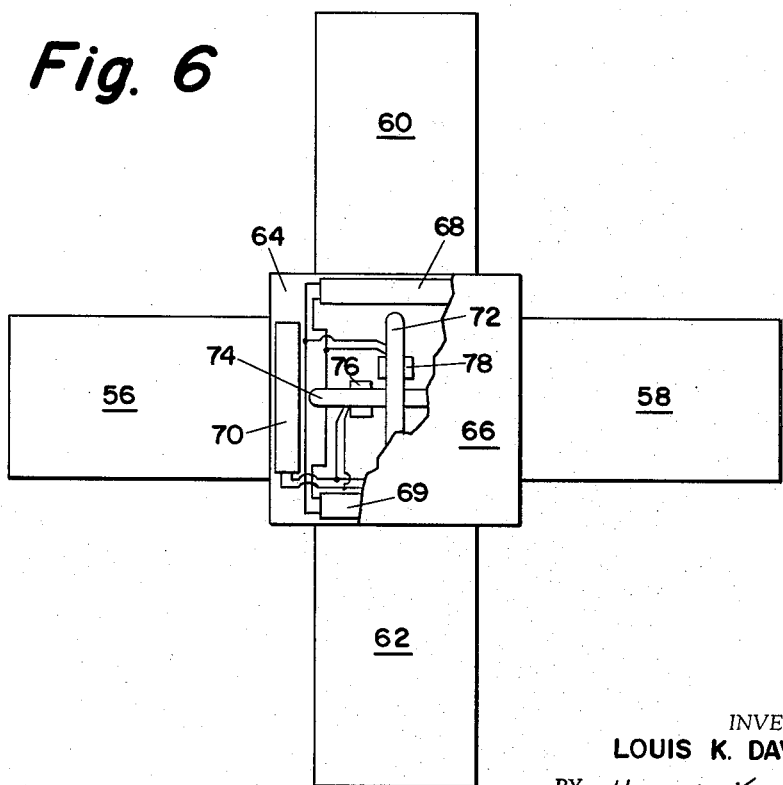

United States Patent Office 3,226,062
Patented Dec. 28, 1965

3,226,062
OSCILLATION DAMPING SYSTEM
Louis K. Davis, Phoenixville, Pa., assignor to General Electric Company, a corporation of New York
Filed June 18, 1964, Ser. No. 376,119
9 Claims. (Cl. 244—93)

This invention pertains to the damping of oscillations in a system subject to restoring torques; and more particularly to the damping of oscillations in a system subject to restoring torques produced by incident radiation.

It is known in the art that incident electromagnetic radiation produces a pressure upon any surface which it strokes, and it has been suggested that a structure analogous to a sea anchor be provided to stabilize the attitudes of space vehicles with respect to a source of radiation, such as the sun. However, the pressure of solar radiation is rather small, so that any reasonable size of vehicle structure will provide restoring or stabilizing torques of rather small magnitude. In space, in the absence of aerodynamic forces or effective gravitational forces, such torques suffice to provide restoration to a neutral or zero position, but they may be insufficient, in the absence of damping, to prevent tumbling, or complete rotation about the center of oscillation; and they cannot provide rapid damping even of oscillations short of complete rotation.

In U.S. Patent 2,856,142 (which issued to the assignee of the present application) it is disclosed how angular momentum of a freely rotatable system, such as a space vehicle, may be absorbed or stored in a fluid mass circulating about the axis of such angular momentum, leaving the remainder of the system at zero angular velocity. In that patent, there are disclosed the particular practical advantages of the use of a fluid mass for such purpose, although it is possible to employ conventional solid flywheels for the same purpose.

It is desirable to minimize the total time that flywheels are employed for storage because they dissipate energy while rotating, and also because there are physical limits to their possible operating speeds. If a flywheel is operating at its maximum permissible speed, it has no excess capacity to store yet more momentum of the same sign if such additional momentum should be added by, for example, a meteoroid impact. We have invented a system in which flywheels are employed to absorb sudden impulses of momentum greater than radiation pressure torques could neutralize rapidly, and the stored momentum of the system is subsequently unloaded against the momentum of the incident radiation at a much lower rate. If fluid flywheels and magnetic pumps are employed, there results a system which, while not literally a passively stabilized system, has a minimum of moving parts and is capable of very long life. The radiation itself may be converted by photovoltaic cells to electricity as the source of energy for operating the pumps, so that, given adequately long life in the cells, such a system is capable of embodiment with no inherently short-lived components.

We achieve these desirable aims in a preferred embodiment of our invention by connecting photovoltaic (or, more briefly "solar") cells to drive electromagnetic pumps of fluid flywheels, and so locating the solar cells that, when the system is in its stable or neutral position, the solar cells are all in shadow; but if the system is displaced from its neutral position, those solar cells are illuminated which will drive the fluid flywheels in the proper direction to reduce the displacement. Thus we accomplish a variety of desirable objects: We obtain the desirable characteristics of flywheel stabilization without requiring the continuous dissipation of energy and without the inconvenient possibility of saturating the flywheel (or the necessity of discharging mass to unload it); alternatively viewed, we relieve the solar stabilized vehicle of a major inconvenient feature, that of poor damping, without the addition of short-lived or extremely complex devices. More generally, we teach and achieve the use of stabilizing torques of limited amplitude to produce stabilization against disturbing torques of greater amplitude. These objects imply a variety of other desirable ends, such as economy, cheapness, reliability, simplicity which will appear to those skilled in the art in the light of the subsequent description and explanation which it would be needlessly verbose to list in detail.

For the better explanation and understanding of our invention, we have provided figures of drawing in which:

FIG. 5 represents a possible structure of the reverse side of the structure represented by FIG. 1; and FIG. 6 represents schematically and partly cutaway an elevation of an embodiment of our invention which is substantially a combination of two of the embodiments represented by FIGS. 1 and 2, to provide stabilization around two orthogonal axes.

Figure 1:
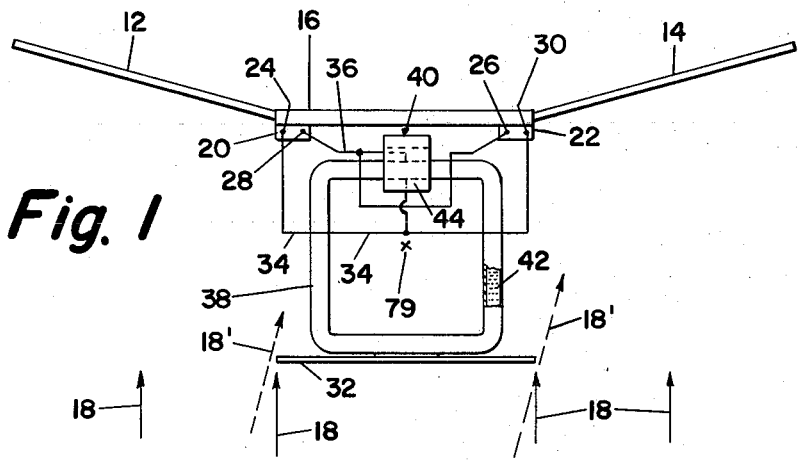
FIG. 1 represents schematically a plan view of an embodiment of our invention adapted to produce stabilization around only a single axis.
Figure 2:
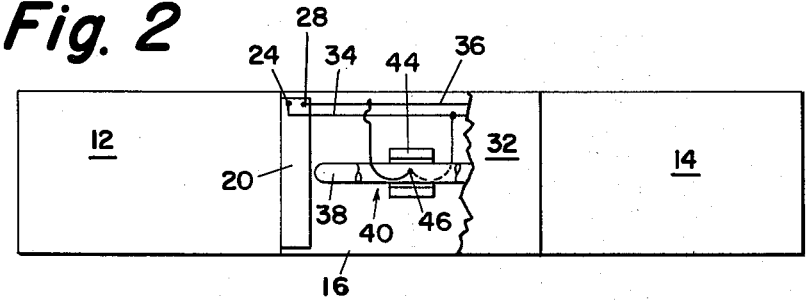
FIG. 2 represents, partly cutaway, an elevation of the embodiment of FIG. 1.

Referring to FIGS. 1 and 2, there are represented two radiation pressure or "solar" panels 12 and 14 which are connected by a frame 16. Panels 12 and 14 are tilted at a slight angle with respect to frame 16 in order that the center of pressure of radiation (represented by arrows 18) will lie behind frame 16 and thus behind the center of mass 19 of the entire embodiment. For simple plane structures, the center of pressure will lie on a normal to the plane through the geometric center of gravity of the plane area; and the center of pressure of two plane structures as represented will lie at the intersection of the two such normals to the two plane structures. The surface of panels 12 and 14 may conveniently be of some polished metal such as aluminum, in order that the momentum transfer of radiation 18 to the panels 12 and 14 may be maximized. It is part of the known art that in an arrangement like the present embodiment, in which the center of radiation pressure lies behind the center of mass 19, the entire assembly will seek to turn so that it faces the incident radiation, as here represented in FIG. 1. However, as has been stated hereinabove, in the absence of any damping, such a structure, if displaced from such an equilibrium or neutral position, will oscillate for an indefinitely long time. Therefore, on frame 16 there are mounted batteries 20 and 22 of solar cells having, respectively, positive terminals 24 and 26, and negative terminals 28 and 30. Positive terminal 24 of battery 20 is connected to negative terminal 30 of battery 22; and negative terminal 28 of battery 20 is connected to positive terminal 26 of battery 22. If both batteries equally were illuminated at the same time, so that they produced equal current outputs, they would evidently short-circuit each other and produce no kind of external output. However, a shade or mask 32, of any convenient material opaque to radiation 18, is so mounted with respect to batteries 20 and 22 that incident radiation 18 will not strike both batteries at the same time. If, for example, the incident radiation arrives at an angle, as represented by arrows 18', it is evident that battery 20 will be illuminated, but battery 22 will remain dark. Similarly, if radiation arrives at an inclination opposite to that represented by arrows 18', battery 20 will remain dark, but battery 22 will be illuminated. It is a characteristic of conventional photovoltaic cells that when dark they present a high resistance to flow of current in the forward direction, that is, the direction in which they drive current when illuminated. Thus, in the arrangement represented, since one battery is dark when the other is illuminated, neither will short circuit the other; the potential produced by the illuminated battery will appear across conductors 34 and 36; but the polarity of the potential will depend upon which battery is illuminated. Thus, if battery 20 is illuminated, conductor 34 will be positive relative to conductor 36; and if battery 22 is illuminated, conductor 34 will be negative relative to conductor 36. The particular interconnection of the terminals of the batteries and the mode of illumination of one battery at a time produces a source of current whose polarity depends upon which battery is illuminated. If it should be desired to employ, instead of the conventional photovoltaic cells described, converters of radiaton to electrical energy which, when dark, exhibit a low resistance to current flow, they may be connected in series instead of parallel, and the same characteristic dependence of polarity upon the identity of the illuminated battery will be obtained.

A closed tubular conduit 38, incorporating a magnetic pump 40, is represented, the combination together with the filling fluid 42 constituting a "fluid flywheel." The details of such an arrangement are described in U.S. Patent 2,856,142, and only the general characteristics of such a device will be given here. The fluid 42 may conveniently be mercury because of its high density and its electrical conductivity, which is essential to the operation of the magnetic pump. Tubular conduit 38 may be of any suitable material or combination of materials not attacked by the fluid 42, and may be electrically conductive, except for the portion comprising a part of magnetic pump 40. Magnetic pump 40 comprises a permanent magnet 44, so arranged that it produces a magnetic field which, in the representation, is normal to the plane of FIG. 1 and vertical in FIG. 2. Conduit 38 is made of electrically nonconductive material in the vicinity of pump 40, and is provided with opposed terminals so located that current passing between them through the liquid will flow at right angles to the field of magnet 44. In FIG. 2, shade or mask 32 and conduit 38 represented partly cut away so that one such terminal, 46, is visible. The other terminal is concealed by the portion of conduit 38 which lies in the field of magnet 44. Conductor 34 is represented connected to terminal 46, and conductor 36 passes behind conduit 38 to make connection with the invisible terminal. In accordance with well known laws of electrodynamics, widely applied in pumps of this type for pumping conductive fluids, the passage of current through the conductive fluid 42 at right angles to the field of magnet 44 will produce a force on the fluid 42 at right angles to both the magnetic field and the direction of current flow, and thus along the axis of conduit 38— in simpler words, passing current through the fluid pumps it. The direction of pumping will depend upon the direction of current flow, for a given direction of the magnetic field. It has already been described how potential between conductors 34 and 36 will depend for its polarity upon which of the solar cell batteries 20 and 22 is illuminated. Thus the direction of pumping will depend upon which battery is illuminated. Since the magnitude of current output will depend upon the total radiation flux incident upon the battery 20 or 22, the pumping effect, and the consequent speed of the fluid 42 in its circulation through conduit 38 will depend upon the total radiation flux incident upon the illuminated battery. Thus, if the incident radiation 18 arrives at angle only slightly different from that represented by arrows 18, the battery 20 or 22 will be only partly illuminated, and the fluid 42 will be pumped at a relatively low velocity; but if battery 20 or 22 is fully illuminated, the fluid 42 will be pumped at maximum velocity.

It has thus been established that a change on the relative angle between the radiation 18 and the normal to frame 16 will illuminate one solar battery 20 or 22 and cause a circulation of fluid 42 through conduit 38 in a direction or sense dependent upon which battery is illuminated; and that that direction or sense will further depend upon the direction of the field of magnet 44. It is appropriate to point out (as is discussed at greater length in the reference Patent 2,856,142) that the circulation of fluid 42 in conduit 38 creates a net angular or rotational momentum around an axis normal to the plane of conduit 38, i.e. normal to the plane of FIG. 1 and vertical in FIG. 2; and the creation of such momentum in the moving fluid 42 necessarily, by Newton's law that action and reaction are equal in magnitude and opposite in sense, creates an equal and opposite change in angular momentum of the rest of the embodiment exclusive of the fluid 42. Thus if, for example, impact of a meteroid or some other casual event imparts angular momentum to the entire structure represented in FIG. 1, the structure will turn relatively to the direction of radiation 18, causing one of the batteries, e.g. 20, to become illuminated. This will cause battery 20 to feed current to pump 40 whose magnet 44, for the purposes of our invention, is so poled that current from battery 20 will cause fluid 42 to circulate in a counterclockwise (as viewed in FIG. 1) direction. The creation of such a circulation will produce a reaction upon the remainder of the structure which will tend to cause it to rotate so that both batteries 20 and 22 are shadowed by shade 32, radiation 18 being normal to shade 32 and frame 16.

The description so far has been purely qualitative, with no consideration of desirable quantitative relationships. These will now be considered.

The periods of oscillation of a space vehicle under radiation pressure restoring torques tend to be very long— of the order of magnitude of hours. The time required to accelerate the stream of fluid 42 in the conduit 38 is very much shorter. Consequently, it may be considered that the fluid 42 accelerates in a negligibly short time to a velocity at which all the energy being supplied by the pump is used up in overcoming frictional losses. This leads to the result that, for a given pump current, the velocity of the pump fluid relative to the vehicle is is effectively fixed; if the vehicle is given angular acceleration, the fluid is likewise accelerated, despite the fact that the electromagnetic pump is not a positive displacement pump, but rather a constant-pressure pump. Any lag between a change in pump current and the corresponding change in fluid velocity is negligibly small. In other words, although the "flywheel" is actually the moving fluid 42, it behaves in all respects as though it were a rigid flywheel rigidly connected to a driving source mounted on the vehicle. This point is important because the detailed explanation of the operation of our invention relies upon the fact that angular momentum of either direction of rotation can be transferred rapidly not only from the flywheel to the vehicle, but also from the vehicle to the flywheel.

To review the known art briefly, if the radiation 18 shifts its direction to that represented by 18', solar panel 12 will have a slightly greater projected area exposed to the radiation, and panel 14 will have a slightly smaller projected area exposed. Furthermore, the lever or moment arm from the center of panel 12 to the center of mass 50 will be slightly increased and that from the center of panel 14 to the center of mass 50 will be slightly decreased. Thus it is evident that the pressure of the radiation 18' will produce torques tending to rotate the vehicle so that frame 16 and shade 32 are normal to the incident radiation. This is in accordance with the standard and known art of orientation by radiation pressure. It is evident that the restoring torque produced by angular displacements of the radiation from the normal or neutral position will increase in magnitude with the magnitude of the angular displacement at least up to values of the displacement such that the radiation is normally incident upon one of the panels. If the fluid flywheel is disabled, as by disconnecting the solar batteries, and the vehicle, in its equilibrium orientation with respect to the radiation is suddenly given a moderate impulse of angular momentum, it will rotate from equilibrium against increasing radiation pressure torques until it is brought to a standstill, at some displacement from equilibrium. The radiation pressure torques will continue, tending to drive it back to equilibrium, but in the process imparting to the vehicle angular momentum equal in magnitude but opposite in direction to that which caused it to swing. This new angular momentum will cause the vehicle to swing an equal amount on the opposite side of the equilibrium point, and it will continue in oscillation by repetition of the events described. It may be seen from the preceding that a given displacement from equilibrium corresponds to a given potential angular momentum which will be made kinetic if the vehicle is allowed to return to equilibrium under action of the radiation pressure torques alone.

Now, it has been indicated that (now assuming the fluid flywheel operative) slight displacement of the direction of incident radiation 18 from its normal angle will produce partial illumination, increasing with the magnitude of the displacement, of solar battery 20 or 22, imparting a proportional angular momentum to fluid 42. Thus a given displacement from equilibrium also corresponds to a given angular momentum of fluid 42. This angular momentum of the fluid, for a given displacement, may be greater than, equal to, or less than the potential angular momentum defined in the preceding paragraph. These three conditions correspond, respectively, to overdamping, critical, and less than critical damping of an oscillatory system.

Specifically, as the vehicle, under an impulse of angular momentum, swings away from its neutral or normal position, a solar battery begins to be illuminated and the fluid 42 absorbs a corresponding amount of angular momentum. If that amount is equal to the amount of potential momentum which the solar pressure would impart to the vehicle in returning it to its neutral position (critical damping), then the slowing down of the fluid as the solar battery is darkened by the return to the neutral position will exactly absorb the potential momentum, and the vehicle will return to its neutral position without overshoot. If the angular momentum absorbed by the fluid 42 is less than the potential momentum (subcritical damping), the vehicle will still have some angular momentum when it reaches its neutral or normal position, and will overshoot, swinging to the opposite side of its neutral position, but it will not swing so far as previously, because the fluid 42 in decelerating has absorbed some of the potential momentum. This second excursion will be damped by the flywheel action of fluid 42, leaving still less momentum to produce a third excursion, and so forth until the amplitude of the excursions becomes negligible. For the final case, if the fluid 42, for a given angular displacement of the vehicle, absorbs more angular momentum than the potential momentum corresponding to that displacement, the overdamping which this implies will allow the vehicle to rotate only through a slight displacement, and then return slowly to its neutral position.

It might appear that the overdamped condition would be the most desirable one. This is not true, for the following reasons. The momentum capacity of the fluid 42 is limited to that produced by full illumination of one of the solar batteries 20 and 22. If this capacity is fully utilized in absorbing a given impulse of momentum and the angular momentum of the fluid 42 is not then unloaded against solar pressure, another impulse in the same direction will not be countered by the flywheel effect of the fluid 42 because that will already be functioning to its maximum effect. What is desired in the operation of our invention is that the fluid 42 absorb and store large increments of momentum and then slowly unload this momentum against the radiation pressure, over a comparatively long time with a comparatively slight displacement from neutral. To achieve this, the vehicle must be allowed to displace sufficiently to produce a torque from the incident radiation. It is part of the known art of damped oscillatory systems that critical damping minimizes the time to return to neutral position, and it is thus critical damping which is most desirable in the practice of our invention.

When a vehicle is first placed in orbit, there is a probability that it will be oriented so far from its desired neutral or stable position that it will tumble, going through a series of complete rotations. It may be shown that the flywheel action of the fluid 42, driven by the appropriate solar battery, will be such even in tumbling that the rotation of the vehicle is slowed down by the fluid 42 when the radiation pressure tends to decelerate the tumbling rotation, and will be speeded up when the radiation pressure tends to accelerate the tumbling rotation. Since the change in angular momentum is proportional to the integral of torque with respect to time, the fact that the vehicle is subject to stabilizing torques for a longer time than it is to antistabilizing torques will result in a net decelerating or braking action, and the tumbling vehicle will be stabilized after some rotations.

Figure 3:
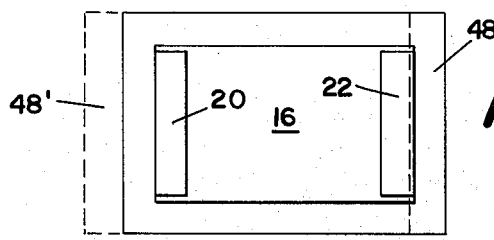
FIGS. 3 and 4 represent patterns of illumination and shadow upon arrays of photovoltaic cells.

The exact nature of the relation between angular displacement and angular momentum of the fluid 42 is subject to some adjustment by the design and location of the solar batteries. It is evident by inspection of FIG. 1 that the shadow of shade 32 will just mask batteries 20 and 22 from incident radiation 18, and any deviation of radiation 18 from incidence normal to the planes of shade 32 and base 16 will result in a partial illumination of one of the batteries 20 and 22. This gives no "dead band," i.e., a range of angles on either side of the normal within which the solar batteries and the fluid flywheel will be inoperative. FIG. 3 represents a relation of batteries 20 and 22 and the shadow 48 of a shade extending farther to the viewer's right and left than the shadow of shade 32, i.e., a shade wider than shade 32. In the representation of FIG. 3, the angle of incidence of the radiation may deviate from normal so far that the shadow 48 is displaced to the left to the position 48′ before the solar batteries and the fluid flywheel are actuated. Similarly, the shadow 48 may be displaced an equal distance to the right before the solar batteries and the fluid flywheel are actuated. Such an arrangement with permit the vehicle to oscillate within the dead band thus determined, without any damping effect from the flywheel. It does have the advantage that the solar cells will not be exposed to radiation by slight oscillations; but, unless the solar cells are limited in life, this is no great advantage. It is usually preferably to have a characteristic without a dead band, which will tend to home on the neutral position instead of oscillating around it. However, it may be desirable that the response to slight deviations be less than that to major displacements. Such a characteristic is disclosed by the arrangement represented in FIG. 4. Here the cognates of batteries 20 and 22 are batteries 201 and 221. These batteries have a small number of cells located at the boundaries of the shadow 48, so that even a small displacement will produce illumination of a small part of one of the solar batteries 201 and 221, with a corresponding slight production of momentum in the fluid 42; but only a displacement sufficient to shift the shadow 48 to the position 48′ will begin to illuminate the main part of the battery. Such a characteristic is useful for the control of tumbling. The damping provided by the small projecting portions of batteries 201 and 221 may be designed to be critical, and that provided by the main portions of those batteries may be far beyond the critical. Then for large external impulses of angular momentum the heavily overdamped action of the fluid flywheel will limit the angular excursions of the vehicle, but the large angular momentum which the fluid 42 will thereby acquire may be dumped against the radiation pressure by the critical damping action of the cells in the small projections.

Figure 4:
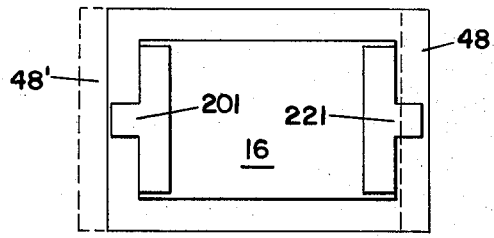

In the embodiments represented thus far, if the vehicle tumbles so as to face completely away from the source of radiation, all the solar batteries will be dark, so that the fluid 42 of the fluid flywheel will not rotate. The torques upon the vehicle reverse from radiation pressure will be completely unpredictable from the mere fact that it tends to seek a stable position when illuminated from the front, since the reverse may have any configuration. However, if the back surfaces of radiation pressure panels 12 and 14 are exposed to radiation when the vehicle is facing away from the source of radiation, pressure on the reverse will tend to cause the vehicle to complete a revolution instead of remaining locked by radiation pressure in the reverse position. To cause the fluid flywheel to assist in disposing of the vehicle momentum even when the reverse side faces the source of radiation, additional solar batteries may be mounted on the reverse side, as represented in FIG. 4. In FIG. 5 the reverses of panels 12 and 14 are represented. On the back of frame 16 a solar battery 50 is represented as mounted back-to-back with battery 20 on the obverse. Battery 50 is connected in parallel with battery 20, in the same polarity. Similarly a battery 52 is indicated as mounted back-to-back with battery 22, and connected in parallel with it, in the same polarity. A shade 54, similar to shade 32, is mounted on the reverse of frame 16 by means not represented since they may be a simple mechanical structure well known in the art. It may be shown that in tumbling, the batteries 50 and 52 operate like the batteries 20 and 22 to cause the operation of the fluid flywheel to unload the momentum against radiation pressure until the remaining momentum is insufficient for complete rotation, and the previously described stabilizing process occurs.

The entire discussion and disclosure thus far has deal only with stabilization around only one axis. It is believed obvious how the invention here disclosed may be applied to stabilization around two axes both normal to the direction of incident radiation. However, for completeness, such an application is represented in FIG. 6. In this figure, radiation pressure panels 56 and 58, and 60 and 62 form pairs similar to panels 12 and 14 of FIG. 1. The two pairs of panels in FIG. 6 are mounted at right angles to each other by frame 64. A shade or mask 66, represented as partly cut away, corresponds to shade 32 of FIG. 1. Parts of solar batteries 68 and 70 are represented at right angles to each other, each one corresponding to a battery 20 of FIG. 1; and battery 69 corresponds to 22. Similarly, two conduits 72 and 74, at right angles to each other correspond to conduit 38 of FIG. 1; and magnets 76 and 78, to magnet 44. Except for the common frame 64, and the shade 66, all the individual components represented in the embodiment of FIG. 1 appear in duplicate in the embodiment of FIG. 6, forming two complete identical systems independently operative, each acting to damp oscillations around an axis at right angles to the corresponding axis of the other system. It is, of course, possible to employ three systems with their axes at sixty degrees, and to make other elaborations but the basic principles involved remain the same; and the simplicity of the two-axis system renders it preferred where stabilization of a plane of a vehicle toward a source of radiation is required.

There are some applications in which the vehicle is oriented with respect to an axis by means other than radiation pressure; in such case it is possible also for damping to provide a combination of solar batteries and fluid flywheel for storage of momentum.

Reviewing my disclosure, it is evident that the function of the flywheel is basically to store angular momentum; it cannot serve as an infinite sink. The solar batteries serve as radiant energy conversion means to convert solar energy to a more conveniently usable other form, which for the present case is preferably (but not necessarily) electrical. The fluid flywheel may be replaced by a rigid flywheel, in which rigid web or spokes, instead of conduit, restrain the mass for circulatory motion. In such case the pump must be replaced by other drive means, such as a motor; but the drive means must, in any event, be reversible (or the equivalent, opposed drive means operated one at a time, may be employed). While simple shade means have been described as part of the preferred embodiment, other radiation control means such as lenses, prisms, and apertures in various combinations known to the optical art are usable equivalents. In my disclosure I have been concerned to represent and describe my presently preferred embodiment; and simplicity is so intimately associated with reliability and long life in the present state of the art that I have preferred the simplest adequate means of performing the various functions.

The appended claims are in subparagraph form for simplicity in reading, in accordance with the recommendation of the Commissioner of Patents, and their division into subparagraphs is solely for that purpose and does not indicate any necessary relation between the various elements recited.

I claim:

1. A vehicle self-orienting and self-damping, in free flight about an axis passing through the vehicle and with respect to a source of radiation, comprising:
   radiation-receiving means which, when the vehicle is in or near its neutral or stable attitude toward the said source of radiation, produce from reception of said radiation a resultant force whose center of pressure lies on the side of the center of mass of the said vehicle opposite the said source of radiation and aligned with the said center of masses and the stable direction of the said source of radiation;
   angular momentum storage means comprising:
     a mass restrained for circulatory motion about the said axis and
     reversible drive means for circulating the said mass in either direction about the said axis at various speeds responsively to energy inputs;
   radiant energy conversion means comprising a plurality of components to severally receive said radiant energy and convert it into other form of energy and connected to apply said other form of energy to cause the said mass of said angular momentum storage means to be driven in a direction determined by the identity of the said component and at a speed determined by the rate of reception of said radiant energy by the said component;
   shade means located generally to intercept radiant energy from the said source to the said radiant energy conversion means when the said vehicle is in its neutral or stable attitude toward the said source, and to permit, when the vehicle is slightly displaced, by rotation around the said axis, from the said neutral or stable attitude, selective illumination of components of the said plurality which are connected to drive the mass of the said angular momentum storage means in the direction of the said rotation around the said axis.

2. A vehicle self-orienting and self-damping, in free flight, about an axis passing through the vehicle and with respect to a source of radiation, comprising:
   radiation-receiving means which, when the vehicle is in or near its neutral or stable attitude toward the said source of radiation, produce from reception of the said radiation a resultant force whose center of pressure lies on the side of the center of mass of the said vehicle opposite the said source of radiation and aligned with the said center of mass and the stable direction of the said source of radiation;

angular momentum storage means comprising:
- a fluid mass contained in a conduit forming a closed path about the said axis and
- reversible pump means for circulating the said fluid mass in either direction about the said axis at various speeds responsively to energy inputs;

radiant energy conversion means comprising a plurality of components divided into a first group to receive radiant energy and convert it into electrical energy and connected to apply the said energy to drive the mass of said angular momentum storage means in a first direction at a speed proportionate to the rate of conversion of the said radiant energy by the said first group, and a second group to receive radiant energy and convert it into electrical energy and connected to apply the said energy to drive the mass of said angular momentum storage means in a second direction at a speed proportionate to the rate of conversion of the said radiant energy by the said second group;

shade means located generally to intercept radiant energy from the said source to the said radiant energy conversion means when the said vehicle is in its neutral or stable attitude toward the said source, and to permit, when the vehicle is slightly displaced, by rotation around the said axis, from the said neutral or stable attitude, selective illuminiaton of components of a group of the said plurality which are connected to drive the mass of the said angular momentum storage means in the direction of the said rotation around the said axis.

3. A vehicle self-orienting and self-damping, in free flight, about an axis passing through the vehicle and with respect to a source of radiation, comprising:

radiation-receiving means comprising planar panels so oriented that normals to the said panels passing through the respective geometric centers of gravity of their surfaces intersect at a point more remote from the said source of radiation than the center of mass of the said vehicle in its neutral or stable attitude;

angular momentum storage means comprising:
- a mass restrained for circulatory motion about the said axis and
- reversible drive means for circulating the said mass in either direction about the said axis at various speeds responsively to energy inputs;

radiant energy conversion means comprising a plurality of components to severally receive said radiant energy and convert it into other form of energy and connected to apply said other form of energy to cause the said mass of said angular momentum storage means to be driven in a direction determined by the identity of the said component and at a speed determined by the rate of reception of said radiant energy by the said component;

shade means located generally to intercept radiant energy from the said source to the said radiant energy conversion means when the said vehicle is in its neutral or stable attitude toward the said source, and to permit, when the vehicle is slightly displaced, by rotation around the said axis, from the said neutral or stable attitude, selective illumination of components of the said plurality which are connected to drive the mass of the said angular momentum storage means in the direction of the said rotation around the said axis.

4. A vehicle self-orienting and self-damping, in free flight, about an axis passing through the vehicle and with respect to a source of radiation, comprising:

radiation-receiving means comprising planar panels so oriented that normals to the said panels passing through the respective geometric centers of gravity of their surfaces intersect at a point more remote from the said source of radiation than the center of mass of the said vehicle in its neutral or stable attitude;

angular momentum storage means comprising:
- a fluid mass contained in a conduit forming a closed path about the said axis and
- reversible pump means for circulating the said fluid mass in either direction about the said axis at various speeds responsively to energy inputs;

radiant energy conversion means comprising a plurality of components divided into a first group to receive radiant energy and convert it into electrical energy and connected to apply the said energy to said pump means to drive the mass of said angular momentum storage means in a first direction at a speed proportionate to the rate of conversion of the said radiant energy by the said first group, and a second group to receive radiant energy and convert it into electrical energy and connected to apply the said energy to said pump means to drive the mass of said angular momentum storage means in a second direction at a speed proportionate to the rate of conversion of the said radiant energy by the said second group;

shade means located generally to intercept radiant energy from the said source to the said radiant energy conversion means when the said vehicle is in its neutral or stable attitude toward the said source, and to permit, when the vehicle is slightly displaced, by rotation around the said axis, from the said neutral or stable attitude, selective illumination of components of the said plurality which are connected to drive the mass of the said angular momentum storage means in the direction of the said rotation around the said axis.

5. A vehicle self-orienting and self-damping, in free flight about an axis passing through the vehicle and with respect to a source of radiation comprising:

radiation-receiving means which, when the vehicle is in or near its neutral or stable attitude toward the said source of radiation, produce from reception of the said radiation a resultant force whose center of pressure lies on the side of the center of mass of the said vehicle opposite the said source of radiation and aligned with the said center of mass and the stable direction of the said source of radiation;

angular momentum storage means comprising:
- a mass restrained for circulatory motion about the said axis and
- reversible drive means for circulating the said mass in either direction about the said axis at various speeds responsively to energy inputs;

radiant energy conversion means comprising a plurality of components to severally receive said radiant energy and convert it into other form of energy and connected to apply said other form of energy to cause the said mass of said angular momentum storage means to be driven in a direction determined by the identity of the said component and at a speed determined by the rate of reception of said radiant energy by the said component;

radiant energy controls means to selectively illuminate components of the said plurality of radiant energy conversion means to drive the mass of the said angular momentum storage means in the direction of displacement of the said vehicle from its neutral or stable attitude.

6. A vehicle self-orienting and self-damping, in free flight, about an axis passing through the vehicle and with respect to a source of radiation, comprising:

radiation-receiving means which, when the vehicle is in or near its neutral or stable attitude toward the said source of radiation, produce from reception of the said radiant a resultant force whose center of pressure lies on the side of the center of mass of the said vehicle opposite the said source of radiation and aligned with the said center of mass and the stable direction of the said source of radiation;

angular momentum storage means comprising:
   a fluid mass contained in a conduit forming a closed path about the said axis and
   reversible pump means for circulating the said fluid mass in either direction about the said axis at various speeds responsively to energy inputs;

radiant energy conversion means comprising a plurality of components divided into a first group to receive radiant energy and convert it into electrical energy and connected to apply the said energy to drive the mass of said angular momentum storage means in a first direction at a speed proportionate to the rate of conversion of the said radiant energy by the said first group, and a second group to receive radiant energy and convert it into electrical energy and connected to apply the said energy to drive the mass of said angular momentum storage means in a second direction at a speed proportionate to the rate of conversion of the said radiant energy by the said second group;

radiant energy control means to selectively illuminate components of the said plurality of radiant energy conversion means to drive the mass of the said angular momentum storage means in the direction of displacement of the said vehicle from its neutral or stable attitude.

7. A vehicle self-orienting and self-damping, in free flight, about an axis passing through the vehicle and with respect to a source of radiation, comprising:

radiation-receiving means comprising planar panels so oriented that normals to the said panels passing through the respective geometric centers of gravity of their surfaces intersect at a point more remote from the said source of radiation than the center of mass of the said vehicle in its neutral or stable attitude;

angular momentum storage means comprising:
   a fluid mass contained in a conduit forming a closed path about the said axis and
   reversible pump means for circulating the said fluid mass in either direction about the said axis at various speeds responsively to energy inputs;

radiant energy conversion means comprising a plurality of components divided into a first group to receive radiant energy and convert it into electrical energy and connected to apply the said energy to drive the mass of said angular momentum storage means in a first direction at a speed proportionate to the rate of conversion of the said radiant energy by the said first group, and a second group to receive radiant energy and convert it into electrical energy and connected to apply the said energy to drive the mass of said angular momentum storage means in a second direction at a speed proportionate to the rate of conversion of the said radiant energy by the said second group;

radiant energy control means to selectively illuminate components of the said plurality of radiant energy conversion means to drive the mass of the said angular momentum storage means in the direction of displacement of the said vehicle from its neutral or stable attitude.

8. A self-orienting self-stabilizing space vehicle comprising:

radiation-pressure receiving means adapted to orient the vehicle, about an axis lying partly in the vehicle, with respect to a source of radiation;

a fluid flywheel oriented to store angular momentum about the said axis;

a reversible electromagnetic fluid pump to drive the fluid in the said flywheel;

first and second solar batteries oriented to receive radiation from the said source when the said vehicle is oriented by the said radiation-pressure receiving means, the positive terminal of the first said solar battery being connected to the negative terminal of the second said solar battery, and the negative terminal of the said first solar battery being connected to the positive terminal of the second said solar battery;

a shade located to interrupt the radiation from the said source of radiation to the said first and second solar batteries when the said vehicle is oriented by the said radiation-pressure receiving means, to permit the illumination of the said first solar battery by radiation when the said vehicle is slightly rotated in a first direction around the said axis from the oriented position, and to permit the illumination of the said second solar battery by radiation when the said vehicle is slightly rotated around the said axis in a second direction from the oriented position;

connecting means to connect the interconnected terminals of the said first and second solar batteries to the electrical input terminals of the said electromagnetic fluid pump in such sense that illumination of the said solar battery resulting from rotation of the said vehicle will cause the pump to drive the fluid in a said fluid flywheel in the direction of the said rotation.

9. A vehicle self-orienting and self-damping, for rotation about an axis passing through the vehicle, with respect to a source of radiation, comprising:

orienting means which, when the vehicle is rotated about an axis from its stable orientation, apply to the vehicle torques tending to return it to the said stable orientation;

angular momentum storage means comprising:
   a mass restrained for circulatory motion about the said axis and
   reversible drive means for circulating the said mass in either direction about the said axis at various speeds responsively to energy inputs;

radiant energy conversion means comprising a plurality of components to severally receive said radiant energy and convert it into other form of energy and connected to apply said other form of energy as input to said reversible drive means to cause the said mass of said angular momentum storage means to be driven in a direction determined by the identity of the said component and at a speed determined by the rate of reception of said radiant energy by the said component;

radiant energy control means to selectively illuminate components of the said plurality of radiant energy conversion means to drive the mass of the said angular momentum storage means in the direction of displacement of the said vehicle from its neutral or stable attitude.

No references cited.

MILTON BUCHLER, *Primary Examiner.*